US008981215B2

(12) United States Patent
Yao et al.

(10) Patent No.: US 8,981,215 B2
(45) Date of Patent: Mar. 17, 2015

(54) TERMINATION SLEEVE-EQUIPPED MI CABLE THAT DOES NOT DISTURB AND IS NOT AFFECTED BY MAGNETIC FIELD

(75) Inventors: Kaoru Yao, Hyogo (JP); Taketo Nishikawa, Hyogo (JP)

(73) Assignee: Okazaki Manufacturing Company, Hyogo (JP)

( * ) Notice: Subject to any disclaimer, the term of this patent is extended or adjusted under 35 U.S.C. 154(b) by 0 days.

(21) Appl. No.: 13/635,167

(22) PCT Filed: Mar. 23, 2012

(86) PCT No.: PCT/JP2012/002036

§ 371 (c)(1), (2), (4) Date: Oct. 24, 2012

(87) PCT Pub. No.: WO2013/140462

PCT Pub. Date: Sep. 26, 2013

(65) Prior Publication Data

US 2015/0014053 A1 Jan. 15, 2015

(51) Int. Cl.

*H02G 15/22* (2006.01)
*H01B 7/18* (2006.01)
*H01B 3/02* (2006.01)
*H01B 7/00* (2006.01)
*H01B 7/29* (2006.01)

(52) U.S. Cl.

CPC ................ *H01B 7/1805* (2013.01); *H01B 3/02* (2013.01); *H01B 7/0009* (2013.01); *H01B 7/29* (2013.01)
USPC ................... 174/21 JC; 174/102 P; 174/74 R

(58) Field of Classification Search

CPC ................................ H01R 4/02; H02G 15/025
USPC .......................... 174/21 JC, 102 P, 118, 74 R
See application file for complete search history.

(56) References Cited

U.S. PATENT DOCUMENTS 2,312,506 A * 3/1943 Tomlinson et al. ....... 174/106 R
3,205,296 A * 9/1965 Davis et al. ..................... 174/34
2004/0089463 A1* 5/2004 Nguyen et al. ............. 174/21 JC

FOREIGN PATENT DOCUMENTS

JP 04-242013 A 8/1992
JP 06-021121 A 3/1994
JP 08-191122 A 7/1996
JP 10-021757 A 1/1998
JP 2000-228117 A 8/2000

OTHER PUBLICATIONS

Japanese Office Action for Patent Application No. JP 2012-528972 dated Aug. 3, 2012.

* cited by examiner

*Primary Examiner* — Chau N Nguyen
(74) *Attorney, Agent, or Firm* — Pearne & Gordon LLP

(57) ABSTRACT

The materials used for a termination sleeve-equipped MI cable according to the present invention, including bonded portions formed with silver solder, are all non-magnetic substances, and therefore, there will be no disturbance of an external magnetic field due to the presence of a magnetic substance. Furthermore, a pair or a plurality of pairs of conducting wires of the MI cable that transmit a signal or electric power are each formed in a double helix configuration, and therefore the generation of a magnetic field due to the currents flowing through the conducting wires and the influence from an external magnetic field on a signal or electric power to be transmitted can be minimized by using the two conducting wires of each pair as a single round-trip signal line or as a single round-trip electric power line.

4 Claims, 9 Drawing Sheets

TERMINATION SLEEVE-EQUIPPED MI CABLE THAT DOES NOT DISTURB AND IS NOT AFFECTED BY MAGNETIC FIELD

TECHNICAL FIELD

The present invention relates to a termination sleeve-equipped MI cable for use in places with a strong magnetic field and a high temperature in a fusion reactor, an accelerator, or the like.

BACKGROUND ART

From the viewpoint of heat resistance, it is impossible to use ordinary cables using polyethylene, vinyl, or rubber as the insulating material and the covering material for signal cables and power cables used in places with a high temperature exceeding 300° C., and therefore MI cables are mainly used.

An MI cable is formed by accommodating conducting wires in a metal sheath with an inorganic insulating material powder of magnesia, silica, alumina, or the like disposed between the conducting wires and the metal sheath, and the interior of the MI cable is isolated from the outside air by providing a termination sleeve at its end portion so as to prevent a reduction in insulation resulting from the entry of moisture contained in the outside air into the insulating material powder during transportation or storage, or in use.

A typical conventional structure including an MI cable and a termination sleeve used for places at a temperature of 300° C. or more is shown in the cross-sectional view of FIG. 9, for the case where the MI cable has two conducting wires. The structure is the same for the case where the MI cable has a single conducting wire or three or more conducting wires.

In the interior of an MI cable 1 provided with a termination sleeve 2, two conducting wires 7 run parallel through an inorganic insulating material powder 8 contained in the MI cable 1. The termination sleeve 2 composed of a sleeve tube 4, a ceramic terminal 5, and terminal tubes 6 is provided at a termination of the MI cable 1, and a termination portion of the MI cable 1 is inserted into the sleeve tube 4. The sleeve tube 4 is made of the same material as that of the sheath 3 of the MI cable 1, and the sheath 3 and the sleeve tube 4 are welded around the entire circumference at a weld 14. Also, the other end of the sleeve tube 4 is closed with the ceramic terminal 5, which has two through-holes 5*a* into which the terminal tubes 6 made of the same kind of metal as the conducting wires 7 are inserted, and the conducting wires 7 extend to the outside through the terminal tubes 6. Each of the terminal tubes 6 and the corresponding conducting wire 7 are welded around the entire circumference at a weld 15. In many cases, the space between the MI cable 1 and the ceramic terminal 5 inside the sleeve tube 4 is filled with an inorganic insulating material powder 9 of magnesia, silica, alumina or the like in order to fix the conducting wires 7 to each other and prevent contact between the conducting wires 7, and between the conducting wires 7 and the sleeve tube 4.

The ceramic terminal 5 and the sleeve tube 4, and the terminal tube 6 and the ceramic terminal 5 are silver soldered around the entire circumference. The interior of the MI cable 1 is isolated from the outside air by the silver soldering, as well as the welding around the entire circumference between the sheath 3 and the sleeve tube 4 and between the terminal tubes 6 and the respective corresponding conducting wires 7, and thus the entry of moisture is prevented.

As for the above-described silver soldering between the ceramic terminal 5 and the sleeve tube 4, and between the ceramic terminal 5 and the terminal tubes 6, the adhesiveness between ceramic and silver solder is poor, and it is therefore common that the bonding surface of ceramic is metallized, then metal-plated, and silver soldered to metal, thus improving the adhesiveness (see, for example, Patent Document 1).

PRIOR ART DOCUMENT

Patent Document

[Patent Document 1] JP 08-191122A

SUMMARY OF INVENTION

Problem to be Solved by the Invention

When an MI cable is laid in a place with a high temperature and a strong magnetic field, such as the interior of a vessel of a fusion reactor or an accelerator, as a signal cable for transmitting signals or a power cable for transmitting electric power, if the sheath of the MI cable, as well as the sleeve tube and the terminal tubes of the termination sleeve are made of a non-magnetic substance (a material that does not become magnetized in a magnetic field) metal, then a magnetic field enters into these components. This has resulted in the problem that a signal or electric power to be transmitted is disturbed by electromagnetic induction caused by fluctuations in a magnetic field and also the problem that the magnetic field surrounding the MI cable is disturbed by a magnetic field created by the currents flowing through the conductors of the MI cable.

If the sheath of the MI cable as well as the sleeve tube and the terminal tubes of the termination sleeve are made of a magnetic substance (a material that becomes magnetized in a magnetic field) metal in order to avoid these problems, there will be no entry of an external magnetic field into the MI cable nor leakage of the magnetic field created by the currents of the conductors of the MI cable to the outside. However, this poses the problem that the magnetic field surrounding the MI cable is disturbed due to the presence of the magnetic substance.

It is an object of the present invention to provide an MI cable that minimizes the influence of an external magnetic field on a signal or electric power to be transmitted and also minimizes the disturbance of an external magnetic field even when installed in a place where a strong magnetic field is present, and a termination sleeve thereof.

Means for Solving the Problems (First Aspect)

According to a first aspect of the present invention, there is provided a termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein: the MI cable uses non-magnetic stainless steel as a material of the sheath, and the conducting wires accommodated therein are a pair or a plurality of pairs of conducting wires that are each formed in a double helix configuration; the termination sleeve includes a titanium sleeve tube, a ceramic terminal, and titanium terminal tubes; a termination portion of the MI cable is inserted up to an intermediate portion of the sleeve tube; an opening of the sleeve tube located on a side opposite to the side on which the MI cable is inserted is closed by the ceramic terminal; the ceramic terminal is provided with the same number of through-holes as the number of the conducting wires of the MI cable, and the terminal tubes are inserted into the respective corresponding through-holes; a trailing edge of each of the conducting wires extends to the outside of the termination sleeve through the corresponding terminal tube; an inner face of the sleeve tube and an outer face of the sheath of the MI cable, an outer face of the ceramic terminal and an inner face of the sleeve tube, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof, and the silver soldering between the ceramic terminal and the sleeve tube, and between the ceramic terminal and each of the terminal tubes is performed after a surface of the ceramic terminal is metallized with titanium and plated with nickel-phosphorus.

Non-magnetic stainless steel, titanium, and silver solder, which are the materials used for the termination sleeve-equipped MI cable, are all non-magnetic substances. Also, the plating material is selected from among various materials, including, for example, nickel-boron (Ni—B), nickel-phosphorus (Ni—P), and nickel-phosphorus has been confirmed to be non-magnetic by experiment. The other materials, namely, ceramic and the inorganic insulating materials of the MI cable, are also non-magnetic substances, and copper or the like, which is used as the conducting wire material, is usually a non-magnetic substance.

Thus, all the materials used are non-magnetic substances, and therefore there will be no disturbance of an external magnetic field due to the presence of a magnetic substance.

Note that examples of non-magnetic stainless steel widely used as industrial materials include SUS 316 stainless steel and SUS 304 stainless steel, which are austenitic stainless steel. SUS 316 is hardly magnetized during processing, as compared to SUS 304, and is highly reliable as a non-magnetic substance. Accordingly, SUS 316 is preferably used as the non-magnetic stainless steel of the present invention.

SUS 304 may be used as the non-magnetic stainless steel as long as it has an allowable reliability as a non-magnetic material, and a non-magnetic metal other than stainless steel may also be used. The same applies to second to fourth aspects.

Furthermore, since a pair or a plurality of pairs of conducting wires that transmit a signal or electric power are each formed in a double helix configuration, the generation of a magnetic field due to the currents flowing through the conducting wires and the influence from an external magnetic field can be minimized by using the two conducting wires of each pair as a single round-trip signal line or as a single round-trip electric power line such that the currents flowing through the two conducting wires of each pair flow in opposite directions from each other and have the same magnitude. The reasons for this is that, due to such use of the conducting wires having a double helix configuration, the magnetic fields created by the currents flowing through the two conducting wires of each pair of the MI cable cancel each other to minimize the magnetic field leaking to the outside, and that electromagnetic inductions occurring in the two conducting wires of each pair as a result of fluctuations in an external magnetic field cancel each other to minimize the influence of the external magnetic field. These effects have been demonstrated for cables in which the conducting wire pairs of an ordinary cable, which use polyethylene, vinyl, or rubber as the insulating material and the covering material, are formed in a double helix configuration, i.e., what is called a twist configuration. Such cables have been effectively used in practice.

As described above, even when installed in a strong magnetic field, the termination sleeve-equipped MI cable according to the present invention minimizes the influence of an external magnetic field on a signal or electric power to be transmitted and also minimizes the disturbance of an external magnetic field.

In addition, since the sleeve tube and the sheath, the ceramic terminal and the sleeve tube, the terminal tubes and the ceramic terminal, and the terminal tubes and the conducting wires are silver soldered around the entire circumference, the interior of the MI cable is isolated from the outside air, and there will be no reduction in insulation resistance resulting from the entry of moisture from the outside air into the insulating material powder.

Further, silver soldering is performed after the surface of the silver soldering portion of the ceramic terminal is metallized with titanium, and nickel-phosphorus (Ni—P) plating is provided thereon in order to improve the adhesiveness between ceramic and silver solder, which have poor adhesiveness. Therefore, the ceramic terminal and the sleeve tube, and the terminal tubes and the ceramic terminal are firmly bonded. Furthermore, the sleeve tube and the terminal tubes are made of titanium, which has a coefficient of thermal expansion similar to that of ceramic, and therefore the adhesive strength can be maintained even at a high temperature. Note that the silver soldering between the sleeve tube and the sheath, and between the terminal tubes and the conducting wires is achieved by bonding between metals, and therefore provides good adhesiveness. Accordingly, a firm adhesion can be achieved without performing metallization or plating.

Compared to this, for the conventional structure shown in FIG. 9, the terminal tubes 6 need to be made of the same material as that of the conducting wires in order to weld the terminal tubes 6 and the conducting wires 7. However, the material used for the conducting wires may not necessarily have a coefficient of thermal expansion similar to that of ceramic, and therefore the adhesion between the ceramic terminal 5 and the terminal tubes 6 at a high temperature is less reliable than that achieved by the present invention.

(Second Aspect)

According to a second aspect of the present invention, there is provided a termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein: the MI cable uses non-magnetic stainless steel as a material of the sheath, the conducting wires accommodated therein are a pair or a plurality of pairs of conducting wires that are each formed in a double helix configuration, and a termination portion of the MI cable is inserted into a welded sleeve tube made of non-magnetic stainless steel, which is the same as the material of the sheath, such that an end edge of the MI cable and an end edge of the welded sleeve tube are located at the same position; the termination sleeve includes a titanium sleeve tube, a ceramic terminal, and titanium terminal tubes; a termination portion of the welded sleeve tube into which the MI cable is inserted is inserted up to an intermediate portion of the sleeve tube, and the welded sleeve tube has a length such that a leading edge of the sleeve tube is located on the welded sleeve tube in a state in which the welded sleeve tube is inserted into the sleeve tube; an opening of the sleeve tube located on a side opposite to the side on which the sheath is inserted is closed by the ceramic terminal; the ceramic terminal is provided with the same number of through-holes as the number of the conducting wires of the MI cable, and the terminal tubes are inserted into the respective corresponding through-holes; a trailing edge of each of the conducting wires extends to the outside of the termination sleeve through the corresponding terminal tube; an inner face of the sleeve tube and an outer face of the welded sleeve tube, an outer face of the ceramic terminal and an inner face of the sleeve tube, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof, and a cross section of an end edge portion of the sheath of the MI cable and a cross section of an end edge portion of the welded sleeve tube are welded around the entire circumference thereof; and the silver soldering between the ceramic terminal and the sleeve tube, and between the ceramic terminal and each of the terminal tubes is performed after a surface of the ceramic terminal is metallized with titanium and plated with nickel-phosphorus.

To perform silver soldering, the object to be bonded needs to be heated to a temperature from 700° C. to 800° C. When the sheath of the MI cable is thin, according to the first aspect, the sheath may become hardened and brittle as a result of heating performed during silver soldering of the sleeve tube and the sheath, and may be broken upon application of force from the outside. Adding the welded sleeve tube and silver soldering the welded sleeve tube and the sleeve tube as in the present aspect, instead of silver soldering the sleeve tube and the sheath, make the heat produced at the time of performing silver soldering difficult to be transmitted to the sheath, which makes it possible to reduce the embrittlement of the sheath. Moreover, even if embrittlement occurs, the welded sleeve tube serves to reinforce the sheath, and therefore the sheath will not be broken even if the sheath is thin as long as the welded sleeve tube has a large thickness.

Note that the weld between the cross section of an end edge portion of the sheath and the cross section of an end edge portion of the welded sleeve tube is located inside the sleeve tube and there is no concern that the weld is damaged because it will not be subjected to an external force even if the sheath is thin and becomes brittle due to the heat produced during welding.

The second aspect is configured by adding the welded sleeve tube to the first aspect. The welded sleeve tube is made of a non-magnetic substance and the pairs of conducting wires are each formed in a double helix configuration, and therefore the addition of the welded sleeve tube does not change the fact that, even when the MI cable is installed in a strong magnetic field, it is possible to minimize the influence of an external magnetic field on a signal or electric power to be transmitted and also minimize a disturbance of an external magnetic field. Also, the addition does not change the fact that the interior of the MI cable is isolated from the outside air and that the adhesion between ceramic terminal and metal is firm and this adhesion is also maintained at a high temperature.

Note that the weld between the welded sleeve tube and the sleeve tube constitutes a non-magnetic substance if it is formed by commonly preformed fusion welding or welding using a welding rod of stainless steel, which is the same as the material of the object to be welded, and therefore the above-described effects of the present aspect are not reduced. The same applies to the welds of the following third and fourth aspects.

(Third Aspect)

According to a third aspect of the present invention, there is provided a termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein: the MI cable uses non-magnetic stainless steel as a material of the sheath, the conducting wires accommodated therein are a pair or a plurality of pairs of conducting wires that are each formed in a double helix configuration, and a termination portion of the MI cable is inserted into a welded sleeve tube made of non-magnetic stainless steel, which is the same as the material of the sheath, such that an end edge of the sheath and an end edge of the welded sleeve tube are located at the same position; the termination sleeve includes a sleeve tube, a ceramic terminal, and titanium terminal tubes, one side of the sleeve tube being made of non-magnetic stainless steel, which is the same as the material of the sheath and the welded sleeve tube, and another side thereof being made of titanium, the border between the non-magnetic stainless steel and the titanium being arranged at an intermediate portion of the sleeve tube; a termination portion of the welded sleeve tube into which the MI cable is inserted is inserted up to the intermediate portion of the sleeve tube from the side of the sleeve tube that is made of non-magnetic stainless steel, and the welded sleeve tube has a length such that a leading edge of the sleeve tube is located on the welded sleeve tube in a state in which the welded sleeve tube is inserted into the sleeve tube; an opening of the sleeve tube located on a side opposite to the side on which the sheath is inserted is closed by the ceramic terminal; the ceramic terminal is provided with the same number of through-holes as the number of the conducting wires of the MI cable, and the terminal tubes are inserted into the respective corresponding through-holes; a trailing edge of each of the conducting wires extends to the outside of the termination sleeve through the corresponding terminal tube; a portion of the sleeve tube that is made of non-magnetic stainless steel and a portion thereof that is made of titanium, an outer face of the ceramic terminal and an inner face of the portion of the sleeve tube that is made of titanium, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof, and a cross section of an end edge portion of the sheath of the MI cable and a cross section of an end edge portion of the welded sleeve tube, and a leading edge of the portion of the sleeve tube that is made of non-magnetic stainless steel and the welded sleeve tube are welded around the entire circumference thereof, and the silver soldering between the ceramic terminal and the sleeve tube, and between the ceramic terminal and each of the terminal tubes is performed after a surface of the ceramic terminal is metallized with titanium and plated with nickel-phosphorus.

During silver soldering between metals, a flux is applied onto the surfaces to be joined, for example, for removing the oxide film on the metal surfaces to be joined and facilitating flow of silver solder, and thereafter silver solder is poured. This flux is non-magnetic, but not an insulating material, and therefore the entry of its residue into the inorganic insulating material powder contained inside, for example, may cause a reduction in insulation between the conducting wires, a reduction in insulation between the conducting wires and the sheath, and a reduction in insulation between the conducting wires and the sleeve tube.

During the production process, for the bonding of the termination sleeve by silver soldering, silver soldering between the ceramic terminal and the terminal tube, and between the sleeve tube and the ceramic terminal is performed first. The reason why this is performed first is that silver soldering between ceramic and metal requires heating in a vacuum vessel in order to heat the ceramic uniformly and in a state in which the MI cable is attached, a large-scale vacuum vessel including a heating apparatus is required, which is not realistic in economic terms. The silver soldering of these does not usually use a flux. Even if a flux is used, the silver soldering portion can be accessed from the outside even after performing silver soldering, and therefore the flux residue can be removed.

However, after the sheath and the sleeve tube are then silver soldered in the first aspect, or after the welded sleeve tube and the sleeve tube are then silver soldered in the second aspect, the ceramic terminal has already been silver soldered to the other end of the sleeve tube and thus the interior of the sleeve tube cannot be accessed from the outside. Accordingly, the flux residue remaining in the sleeve tube cannot be removed, and the residue may cause the above-described reduction in insulation.

When the sleeve tube is entirely made of titanium as in the first and second aspects, it is difficult to join the sleeve tube to the sheath or the welded sleeve tube, which are made of stainless steel, by welding because the welding would be performed between dissimilar metals. However, constituting the MI cable-side portion of the sleeve tube by stainless steel as with the welded sleeve tube makes it possible to weld the sleeve tube to the welded sleeve tube, eliminating the possibility of a reduction in insulation caused by any flux residue.

In the case where the silver soldering between the stainless steel portion and the titanium portion in the sleeve tube is performed before the sleeve tube is welded to the welded sleeve, the silver soldering portion can be accessed from the outside even after performing the silver soldering, and therefore the flux residue can be removed.

Note that all the materials used are non-magnetic substances and the pairs of conducting wires are each formed in a double helix configuration. Accordingly, the present aspect is the same as the first and second aspects in that, even if the MI cable is installed in a place with a strong magnetic field, it is possible to minimize the influence of an external magnetic field on a signal or electric power to be transmitted and also minimize a disturbance of an external magnetic field, that the interior of the MI cable is isolated from the outside air, and that the adhesion between the ceramic terminal and metal is firm and this adhesion is maintained even at a high temperature.

(Fourth Aspect)

According to a fourth aspect of the present invention, in addition to any one of the first to third aspects of the present invention, the termination sleeve-equipped MI cable further includes: a cap tube into which is inserted an externally exposed end portion of each of the terminal tubes inserted into the respective corresponding through-holes of the ceramic terminal, the cap tube being made of a non-magnetic substance, which is the same as the material of the conducting wires, wherein: the conducting wires extend to the outside of the termination sleeve through the respective corresponding terminal tubes and the respective corresponding cap tubes; and an outer face of each of the terminal tubes and an inner face of the corresponding cap tube are bonded by silver soldering around the entire circumference thereof, and each of the conducting wires and the corresponding cap tube are welded around the entire circumference thereof at an end portion of the cap tube located on a side opposite to the side on which the corresponding terminal tube is inserted.

When the terminal tubes and the conducting wires are silver soldered as in the first to third aspects, the silver soldering has to be performed at the end of the production process for structural reasons. However, any flux residue inside the sleeve tube cannot be removed because the interior of the sleeve tube is hermetically sealed. Accordingly, this residue may, for example, enter into the inorganic insulating material powder contained inside, thus causing a reduction in insulation as described above.

Although it is difficult to perform welding between the terminal tubes, which are made of titanium, and the conducting wires because the welding would be performed between dissimilar metals, the addition of the cap tubes made of the same material as that of the conducting wires as in the present aspect makes it possible to perform welding between the conducting wires and the cap tubes, eliminating the need for silver soldering between the terminal tubes and the conducting wires and hence the possibility of a reduction in insulation caused by any flux residue.

It is structurally possible to perform silver soldering between each of the cap tubes and the corresponding terminal tube at the early stage of the production and the silver soldering portion can be accessed from the outside even after performing the silver soldering, so that the flux residue can be removed. Even if the flux residue is not removed, it is highly unlikely that the flux residue enters the interior of the sleeve tube and causes a reduction in insulation since each of the cap tubes is silver soldered to a portion of the corresponding terminal tube that extrudes to the outside.

Note that all the materials used are non-magnetic substances and the pairs of conducting wires are each formed in a double helix configuration. Accordingly, the present aspect is the same as the first to third aspects in that, even if the MI cable is installed in a strong magnetic field, it is possible to minimize the influence of an external magnetic field on a signal or electric power to be transmitted and also minimize a disturbance of an external magnetic field, that the interior of the MI cable is isolated from the outside air, and that the adhesion between the ceramic terminal and metal is firm and this adhesion is maintained even at a high temperature.

Effects of the Invention

A termination sleeve-equipped MI cable according to the present invention that does not disturb and is not affected by a magnetic field can minimize the influence of an external magnetic field on a signal or electric power to be transmitted and also minimize a disturbance of an external magnetic field even if it is installed in a place with a strong magnetic field.

MODES FOR CARRYING OUT THE INVENTION

First Embodiment

Figure 1:
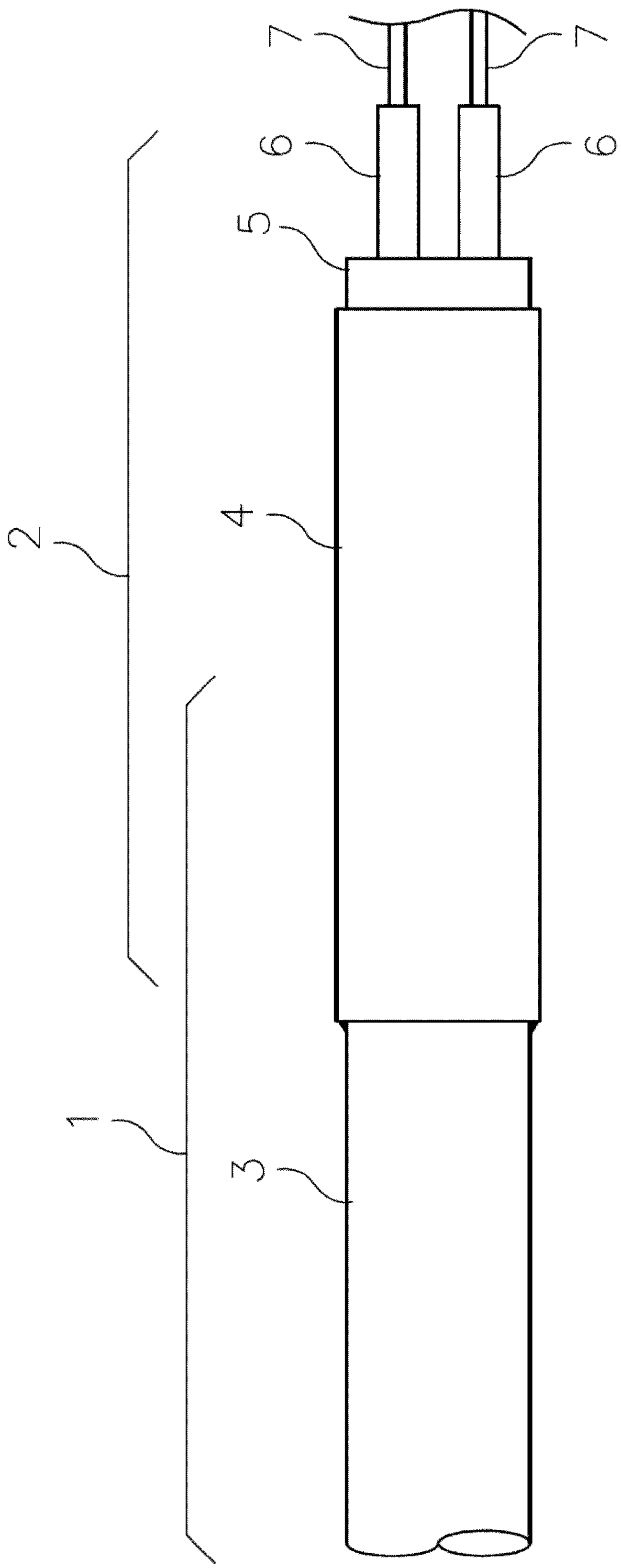
FIG. 1 is an external view of a termination sleeve-equipped MI cable according to a first embodiment of the present invention that does not disturb and is not affected by a magnetic field.
Figure 2:
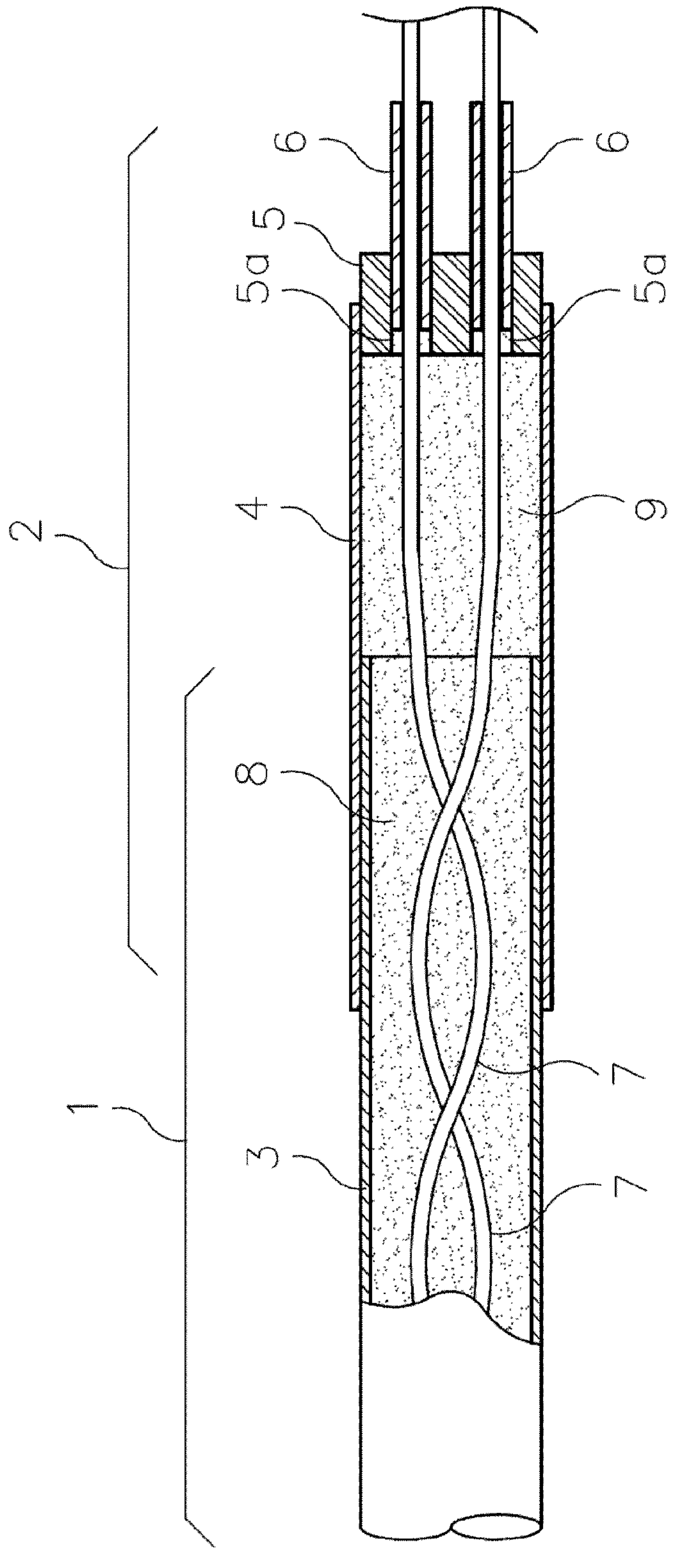
FIG. 2 is a cross-sectional view of the termination sleeve-equipped MI cable according to the first embodiment of the present invention that does not disturb and is not affected by a magnetic field.

A termination sleeve-equipped MI cable according to a first embodiment of the present invention that does not disturb and is not affected by a magnetic field will be described with reference to the drawings. Here, FIG. 1 is an external view of the termination sleeve-equipped MI cable according to the first embodiment of the present invention that does not disturb and is not affected by a magnetic field, and FIG. 2 is a cross-sectional view thereof. In FIG. 2, conducting wires 7 are shown in their external view. Although only one end portion of the MI cable is shown FIGS. 1 and 2, the other end portion is configured in the same manner, and drawings thereof are omitted.

As shown in FIGS. 1 and 2, a termination sleeve 2 for preventing the entry of moisture from the outside is provided at a termination of the MI cable 1.

The MI cable 1 accommodates a pair of (two) conducting wires 7 having a double helix configuration inside a sheath 3 with an inorganic insulating material powder 8 of magnesia, silica, alumina, or the like disposed between the conducting wires 7 and the sheath 3. SUS 316 stainless steel is used as the material of the sheath 3, and copper is used as the material of the conducting wires 7.

In the present embodiment, a description will be given of a case where a pair of conducting wires 7 are accommodated in the MI cable 1, but the present invention is not limited thereto. It is also possible to use a plurality of pairs of conducting wires that are each formed in a double helix configuration, and the same applies to the second and third embodiments.

Figure 7:
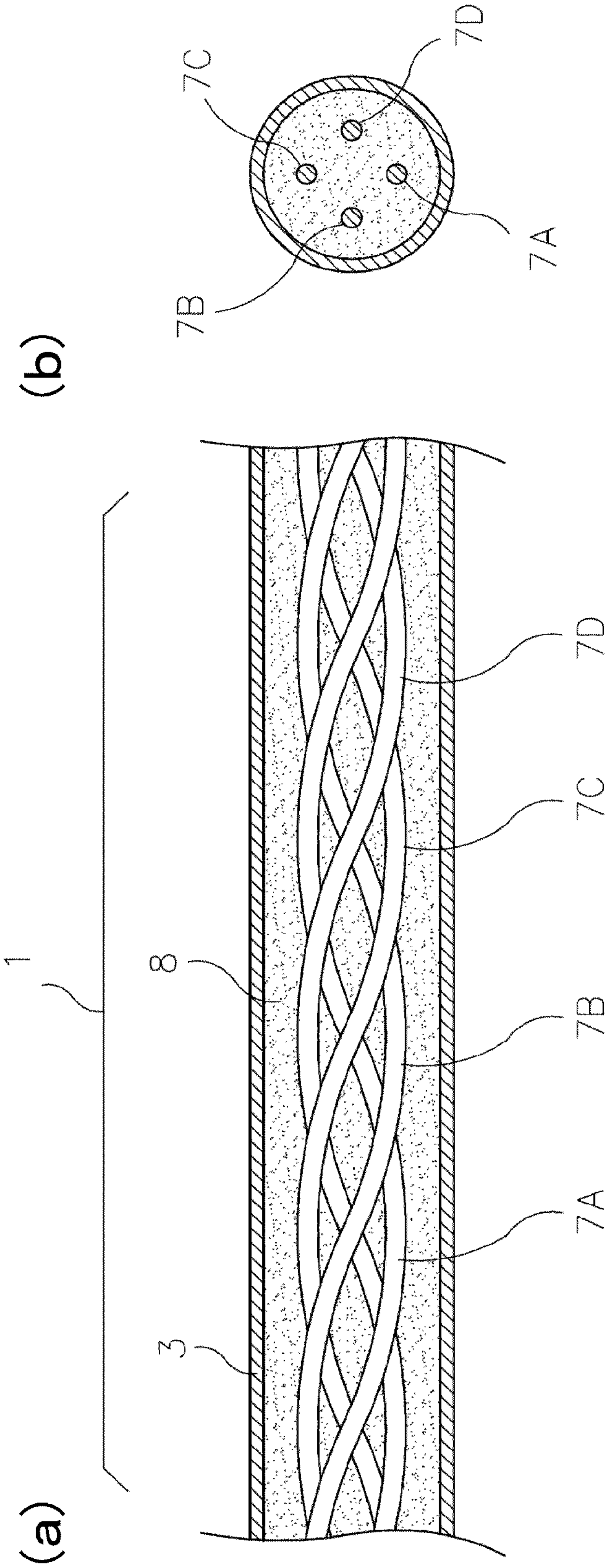
FIG. 7(*a*) is a cross-sectional view of an MI cable in which two pairs of conducting wires are each formed in a double helix configuration, and FIG. 7(*b*) is a vertical cross-sectional view of the right end portion of FIG. 7(*a*).

FIG. 7(*a*) shows a cross-sectional view of an MI cable for the case where two pairs of conducting wires 7 are each formed in a double helix configuration. Only the conducting wires 7 are shown in their external view. FIG. 7(*b*) is a vertical cross-sectional view of the right end portion of FIG. 7(*a*), with conducting wires 7A and 7C and conducting wires 7B and 7D respectively constituting pairs of conducting wires that are each formed in a double helix configuration.

The termination portion of the MI cable 1 is inserted into a sleeve tube 4 made of titanium. Also, the inner face of the sleeve tube 4 and the outer face of the sheath 3 are bonded by silver soldering around the entire circumference. Further, an opening of the sleeve tube 4 located on the side opposite to the side on which the sheath 3 is inserted is closed by a ceramic terminal 5 made of alumina.

The ceramic terminal 5 is provided with two through-holes 5*a*, into which terminal tubes 6 made of titanium are respectively inserted. Also, the two conducting wires 7 of the MI cable 1 extend to the outside through the respective corresponding terminal tubes 6 inside the through-holes 5*a* of the ceramic terminal. The outer face of the ceramic terminal 5 and the inner face of the sleeve tube 4, the outer face of each of the terminal tubes 6 and the surface of the corresponding through-hole 5*a* of the ceramic terminal 5, and the inner face of each of the terminal tubes 6 and the outer face of the corresponding conducting wire 7 are, in each respective pair, bonded by silver soldering around the entire circumference.

The space between the MI cable 1 and the ceramic terminal 5 inside the sleeve tube 4 is filled with an inorganic insulating material powder 9 of magnesia, silica, alumina, or the like so as to fix the conducting wires 7, thus preventing contact between the conducting wires 7 and contact between each of the conducting wires 7 and the sleeve tube 4. Instead of by filling the space with the inorganic insulating material powder 9, the conducting wires 7 may be fixed by a structure in which an insulator having two through-holes is placed in the space and the conducting wires 7 are respectively passed through the through-holes.

Here, in the present embodiment, in silver soldering between the outer face of the ceramic terminal 5 and the inner face of the sleeve tube 4, and between the surface of each of the through-holes 5*a* of the ceramic terminal 5 and the outer face of the corresponding terminal tube 6, the adhesiveness between ceramic and silver solder is poor. Accordingly, the silver soldering is performed after the surface of the silver soldering portion of the ceramic terminal 5 is metallized with titanium and then nickel-phosphorus (Ni—P) plating is provided thereon in order to make the adhesion firm. Further, the sleeve tube 4 and the terminal tubes 6 are made of titanium, which has a coefficient of thermal expansion close to that of ceramic, and thereby the adhesive strength at a high temperature is maintained.

Since silver soldering between the inner face of the sleeve tube 4 and the outer face of the sheath 3, and between the inner face of each of the terminal tubes 6 and the outer face of the corresponding conducting wire 7 is achieved by adhesion between metals and thus provides good adhesion. Accordingly, a firm adhesion can be achieved without performing metallization or plating.

Note that when a plurality of pairs of conducting wires 7 are accommodated in the MI cable 1, the same number of the through-holes 5*a* of the ceramic terminal as the number of the conducting wires 7 are provided, and the terminal tubes 6 are inserted into the respective corresponding through-holes 5*a* of the ceramic terminal. The same also applies to the second and third embodiments.

SUS 316 stainless steel, titanium, copper, silver solder, and nickel-phosphorus, which are the materials used in the present embodiment described above, are all non-magnetic substances, and ceramics and inorganic insulating materials are also non-magnetic substances. Accordingly, even if the MI cable is installed in a place where there is an external magnetic field, there will be no disturbance of the external magnetic field due to the presence of the magnetic substance. Further, the conducting wires 7 accommodated inside the MI cable 1 are formed in a double helix configuration, and therefore, using these paired two conducting wires as a single round-trip signal line or as a single round-trip electric power line makes it possible to minimize the generation of a magnetic field due to the currents flowing through the conductors and the influence from an external magnetic field.

As described above, with the use of the termination sleeve-equipped MI cable according to the present embodiment that does not disturb and is not affected by a magnetic field, it is possible to minimize the influence of an external magnetic field on a signal or electric power to be transmitted and also minimize the disturbance of an external magnetic field even when the MI cable is installed in a strong magnetic field. Further, the interior of the MI cable 1 is isolated from the outside air by silver soldering the sleeve tube 4 to the sheath 3, the ceramic terminal 5 to the sleeve tube 4, the terminal tubes 6 to the ceramic terminal 5, and the terminal tubes 6 to the conducting wires 7, around the entire circumference, and therefore the inorganic insulating material powders 8, 9 do not experience a reduction in insulation resistance resulting from the entry of moisture from the outside air.

Second Embodiment

Figure 3:
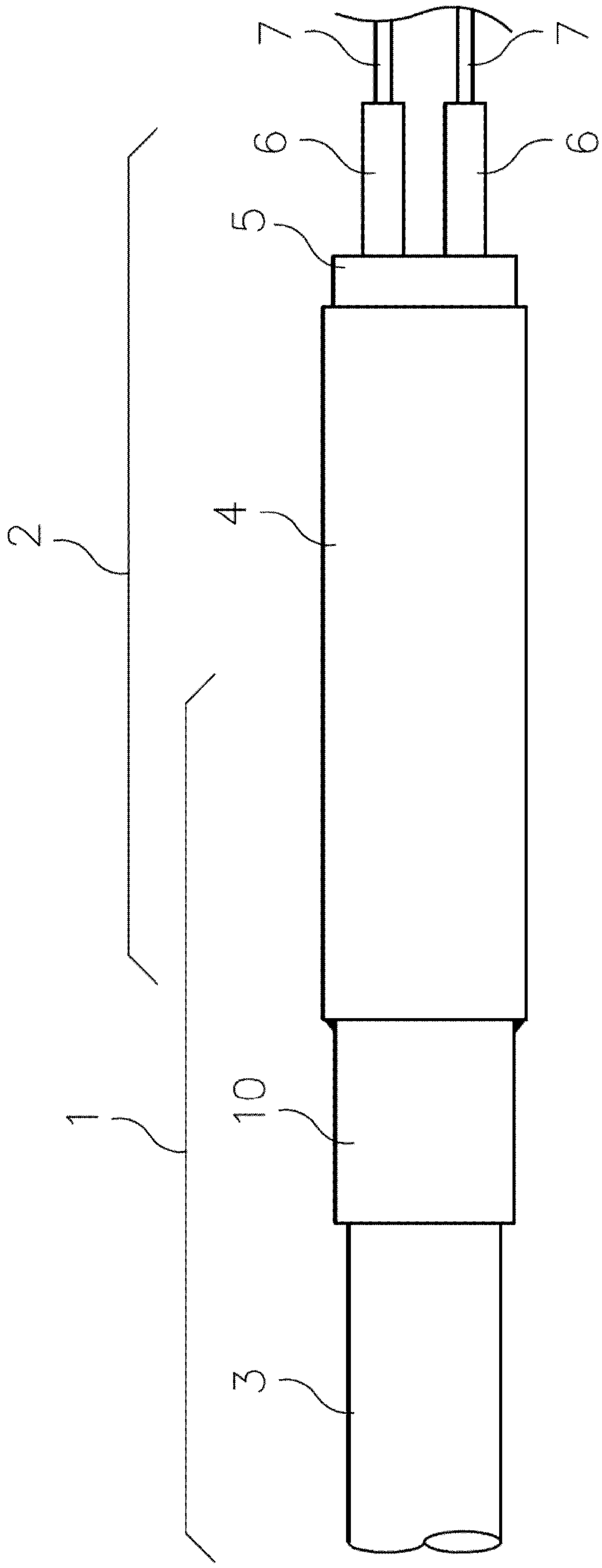
FIG. 3 is an external view of a termination sleeve-equipped MI cable according to a second embodiment of the present invention that does not disturb and is not affected by a magnetic field.
Figure 4:
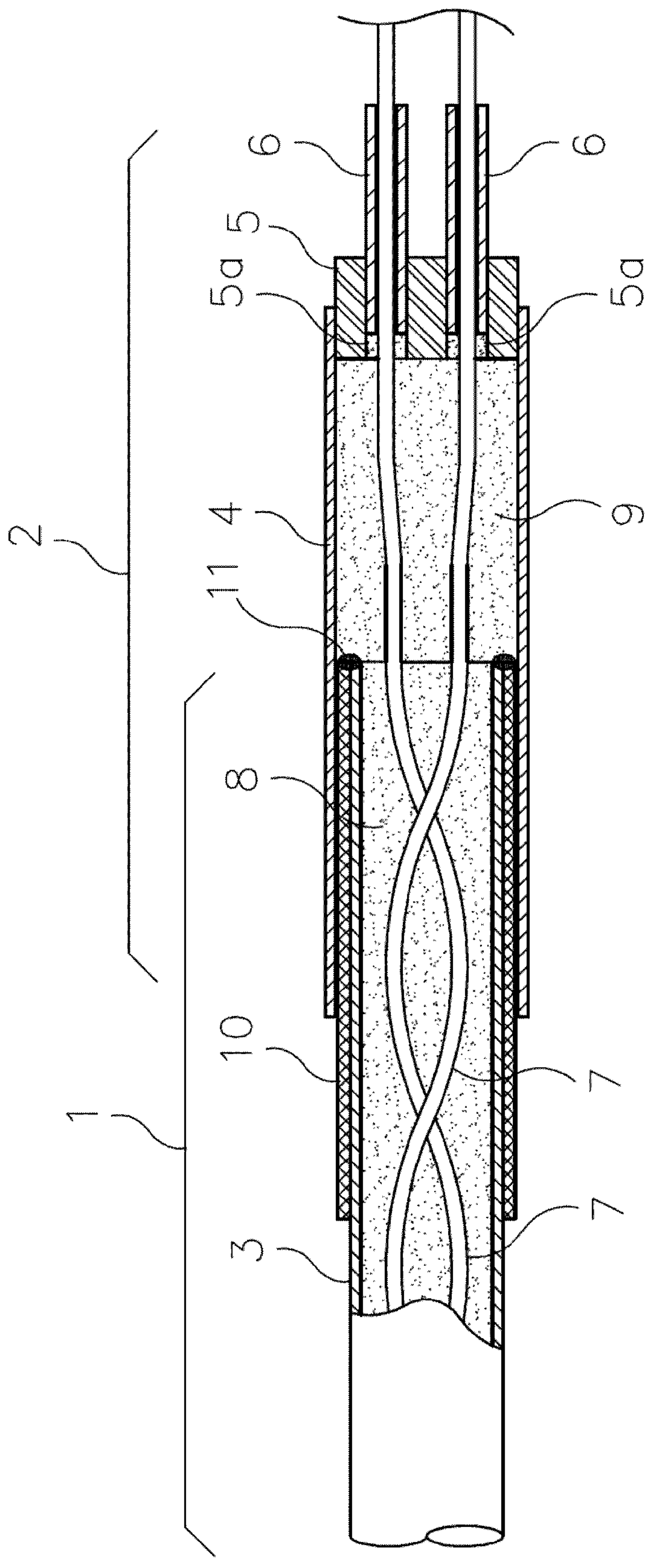
FIG. 4 is a cross-sectional view of the termination sleeve-equipped MI cable according to the second embodiment of the present invention that does not disturb and is not affected by a magnetic field.

Next, a termination sleeve-equipped MI cable according to a second embodiment of the present invention that does not disturb and is not affected by a magnetic field will be described with reference to the drawings. Here, FIG. 3 is an external view of the termination sleeve-equipped MI cable according to the second embodiment of the present invention that does not disturb and is not affected by a magnetic field, and FIG. 4 is a cross-sectional view thereof. In FIG. 4, conducting wires 7 are shown in their external view. Although only one end portion of the MI cable is shown FIGS. 3 and 4, the other end portion is configured in the same manner, and drawings thereof are omitted.

The second embodiment is different from the first embodiment in that a welded sleeve tube 10 made of SUS 316 stainless steel is added, but the rest of the configuration is the same as that of the first embodiment and the detailed description thereof is thus omitted.

A termination portion of the sheath 3 is inserted into the welded sleeve tube 10 such that an end edge of the sheath 3 and an end edge of the welded sleeve tube 10 are located at the same position. Also, the cross section of the end edge of the sheath 3 and the cross section of the end edge of the welded sleeve tube 10 are fusion welded around the entire circumference at a weld 11 shown in FIG. 4.

Here, to perform silver soldering, the object to be bonded needs to be heated to a temperature from 700° C. to 800° C. When the sheath 3 of the MI cable 1 is thin, according to the above-described first embodiment, the sheath 3 may become hardened and brittle as a result of heating performed during silver soldering of the inner face of the sleeve tube 4 and the outer face of the sheath 3, and may be broken upon application of force from the outside, for example, at the time of laying the MI cable 1. Therefore, according to the present embodiment, using the welded sleeve tube 10 and silver soldering the welded sleeve tube 10 and the sleeve tube 4, instead of silver soldering the sleeve tube 4 and the sheath 3, make the heat produced at the time of performing silver soldering difficult to be transmitted to the sheath, which makes it possible to reduce the embrittlement of the sheath 3. Moreover, even if embrittlement occurs, the welded sleeve tube 10 serves to reinforce the sheath 3, and therefore the sheath 3 can be prevented from breaking by making the welded sleeve tube 10 thick.

Note that the weld 11 between the cross section of an end edge portion of the sheath 3 and the cross section of an end edge portion of the welded sleeve tube 10 is located inside the sleeve tube 6 and there is no concern that the weld 11 is damaged because it will not be subjected to an external force even if the sheath 3 is thin and becomes brittle due to the heat produced during welding.

As described above, the structure other than the welded sleeve tube 10 and the materials are the same as those in the first embodiment, i.e., all the components, including the welded sleeve tube 10, are made of non-magnetic materials and the conducting wires 7 of the MI cable 1 are formed into a double helix. Accordingly, the present embodiment is the same as the first embodiment in that, even when the MI cable is installed in a strong magnetic field, it is possible to minimize the influence of an external magnetic field on a signal or electric power to be transmitted and also minimize a disturbance of the external magnetic field.

Further, the present embodiment is the same as the first embodiment in that the sleeve tube 4 and the welded sleeve tube 10, the ceramic terminal 5 and the sleeve tube 4, the terminal tubes 6 and the ceramic terminal 5, and each of the terminal tubes 6 and the corresponding conducting wire 7 are silver soldered around the entire circumference, and the welded sleeve tube 10 and the sheath 3 are welded around the entire circumference, so that the interior of the MI cable 1 is isolated from the outside air, and there will be no reduction in insulation resistance resulting from the entry of moisture from the outside air. The present embodiment is also the same as the first embodiment in that the adhesion between the ceramic terminal 5 and metal is firm and this adhesion is maintained even at a high temperature.

Third Embodiment

Figure 5:
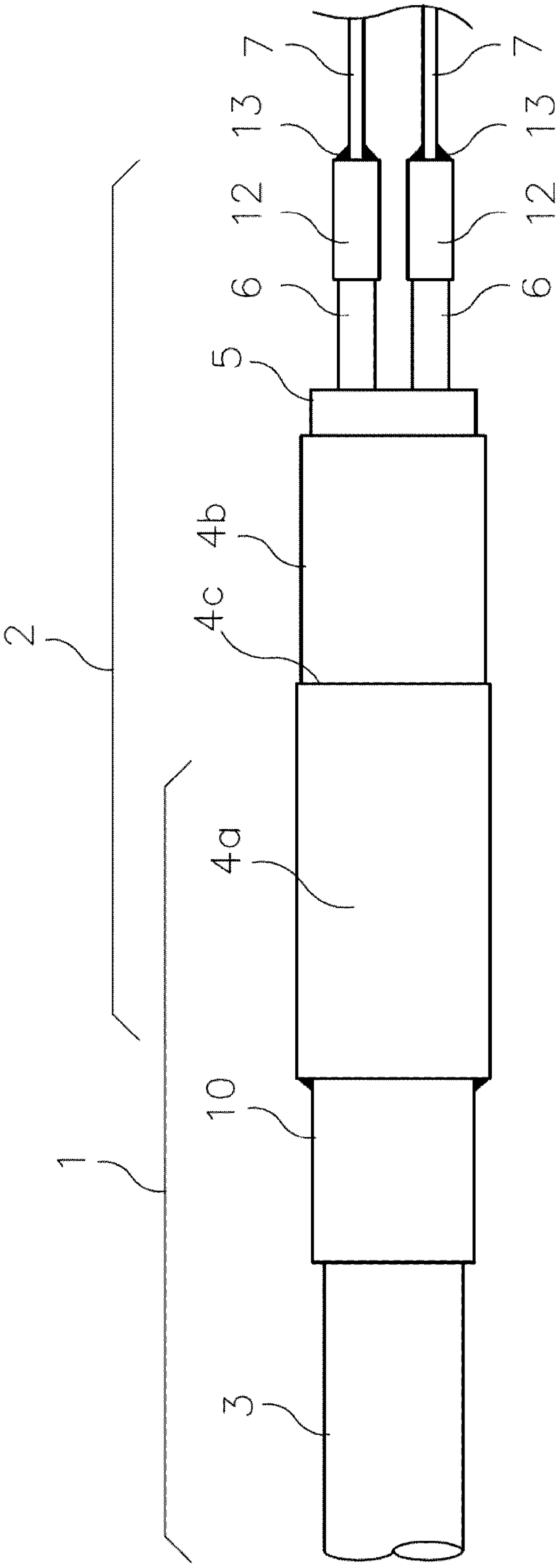
FIG. 5 is an external view of a termination sleeve-equipped MI cable according to a third embodiment of the present invention that does not disturb and is not affected by a magnetic field.
Figure 6:
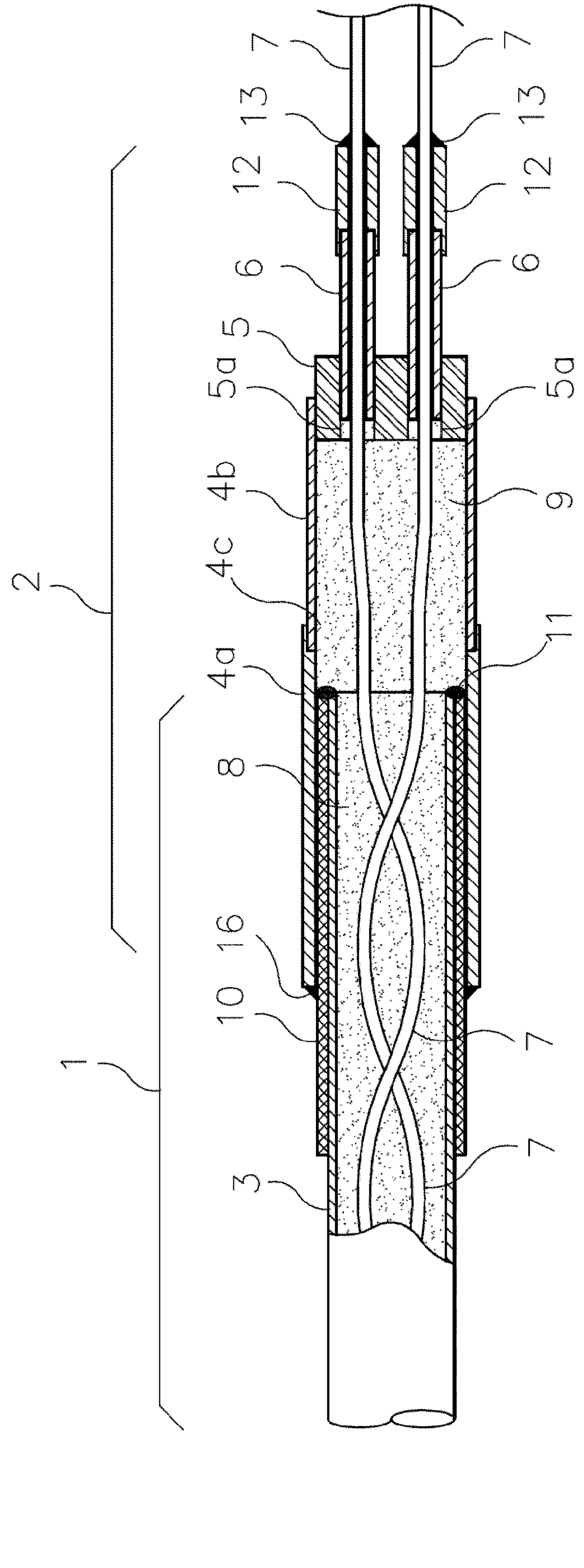
FIG. 6 is a cross-sectional view of the termination sleeve-equipped MI cable according to the third embodiment of the present invention that does not disturb and is not affected by a magnetic field.

Next, a termination sleeve-equipped MI cable according to a third embodiment of the present invention that does not disturb and is not affected by a magnetic field will be described with reference to the drawings. Here, FIG. 5 is an external view of the termination sleeve-equipped MI cable according to the third embodiment of the present invention that does not disturb and is not affected by a magnetic field, and FIG. 6 is a cross-sectional view thereof. In FIG. 6, conducting wires 7 are shown in their external view. Although only one end portion of the MI cable is shown FIGS. 5 and 6, the other end portion is configured in the same manner, and drawings thereof are omitted.

The third embodiment is different from the second embodiment in that the sleeve tube 4 made of titanium in the second embodiment is changed such that an MI cable-side sleeve tube 4*a* is made of SUS 316 stainless steel and a ceramic terminal-side sleeve tube 4*b* is made of titanium, with the border between the SUS 316 stainless steel and the titanium arranged at an intermediate portion of the sleeve tube 4, and that a cap tube 12 made of the same non-magnetic substance as the conducting wires 7 is provided at an end portion of each of the terminal tubes 6 that is exposed from the ceramic terminal 5. However, the rest of the configuration is the same, and therefore the detailed description thereof is omitted.

In the present embodiment, the sleeve tube 4 is constituted by the MI cable-side sleeve tube 4*a* and the ceramic terminal-side sleeve tube 4*b*, and the MI cable-side sleeve tube 4*a* and the ceramic terminal-side sleeve tube 4*b* are bonded by silver soldering around the entire circumference at a joint 4*c*.

Also, the welded sleeve tube 10 has a length such that the leading edge of the sleeve tube 4*a* is located on the welded sleeve tube 10 in a state in which the welded sleeve tube 10 is inserted into the sleeve tube 4, and the leading edge of the sleeve tube 4*a* and the welded sleeve tube 10 are joined by welding around the entire circumference at a weld 16 shown in FIG. 6, rather than by silver soldering as in the second embodiment.

Furthermore, in the present embodiment, the cap tube 12 is provided at an end portion of each of the terminal tubes 6 that is exposed from the ceramic terminal 5. The end portion of each of the terminal tubes 6 is inserted into the corresponding cap tube 12, and the outer face of the end portion of the terminal tube 6 and the inner face of the cap tube 12 are bonded by silver soldering around the entire circumference.

The conducting wires 7 extend to the outside through the respective corresponding terminal tubes 6 and the respective corresponding cap tubes 12, and each of the conducting wires 7 and the corresponding cap tube 12 is fusion bonded around the entire circumference at a weld 13 located at the leading edge of the cap tube 12 located on the side opposite to the ceramic terminal 5. The terminal tubes 6 and the conducting wires 7 are not silver soldered. The rest of the configuration is the same as that of the second embodiment.

During silver soldering between metals, a flux is applied onto the metal surfaces to be joined, for example, for removing the oxide film on the metal surfaces to be bonded and facilitating flow of silver solder, and thereafter silver solder is poured. This flux is non-magnetic, but not an insulating material, and therefore the entry of its residue into the inorganic insulating material powder contained inside causes a reduction in insulation between the conducting wires, between the conducting wires and the sheath, and between the conducting wires and the sleeve tube.

An advantage of the third embodiment with regard to the removal of the flux residue will be described, in comparison with the first and second embodiments.

In the production procedure of the second embodiment, the surface of each of the through-holes 5*a* of the ceramic terminal and the outer face of the corresponding terminal tube 6, and the inner face of the sleeve tube 4 and the outer face of the ceramic terminal 5 are silver soldered first. After the interior of the sleeve tube 4 is filled with the inorganic insulating material powder 9, the welded sleeve tube 10 that has been welded to the sheath 3 at the welded surface 11 is inserted up to the intermediate portion of the sleeve tube 4, then the inner face of the sleeve tube 4 and the outer face of the welded sleeve tube 10, and the outer face of each of the conducting wires 7 and the inner face of the corresponding terminal tube 6, respectively, are silver soldered. This procedure is followed because the silver soldering between the ceramic terminal 5 and the terminal tubes 6, and between the sleeve tube 4 and ceramic terminal 5 has to be performed in a vacuum vessel in order to uniformly heat ceramic, and it is difficult to perform them after attachment of the welded sleeve tube 10 into which the MI cable 1 is inserted since a large-scale vacuum vessel including a heating apparatus is required, which is unrealistic.

Silver soldering between the inner face of the ceramic terminal 5 and the outer face of each of the terminal tubes 6, and that between the inner face of the sleeve tube 4 and the outer face of the ceramic terminal 5 that is performed first does not usually use a flux. Even if a flux is used, the silver soldering portion can be accessed from the outside even after performing silver soldering, and therefore the flux residue can be removed. However, in the subsequently performed silver soldering between the outer face of the welded sleeve tube 10 and the inner face of the sleeve tube 4, the ceramic terminal 5 has already been attached to the sleeve tube 4, and therefore the interior of the sleeve tube 4 cannot be accessed from the outside after performing the silver soldering. Accordingly, the flux residue remaining in the sleeve tube 4 cannot be removed and may enter into the inorganic insulating powder 8 contained inside the MI cable or the inorganic insulating material powder 9 contained inside the sleeve tube, thus causing a reduction in insulation.

In the first embodiment as well, the silver soldering between the surface of each of the through-holes 5*a* of the ceramic terminal and the outer face of the corresponding terminal tube 6, and between the inner face of the sleeve tube 4 and the outer face of the ceramic terminal 5 needs to be performed first for the same reason, and any unremovable flux residue in the sleeve tube that is produced during silver soldering between the sheath 3 and the sleeve tube 4 may cause a similar reduction in insulation.

When the sleeve tube 4 is entirely made of titanium as in the first and second embodiments, it is difficult to change the joining of the sleeve tube 4 to the sheath 3 of the first embodiment and the welded sleeve tube 10 of the second embodiment, which are made of SUS 316 stainless steel, to welding because the welding would be performed between dissimilar metals. However, the MI cable-side sleeve tube 4*a* is made of SUS 316 stainless steel as with the welded sleeve tube 10 as in the present embodiment, and thereby the sleeve tube 4 can be welded to the welded sleeve tube 10, eliminating the possibility of a reduction in insulation due to a flux residue. Note that, by performing silver soldering between the MI cable-side sleeve tube 4*a* made of SUS 316 stainless steel and the ceramic terminal-side sleeve tube 4*b* made of titanium before welding the MI cable-side sleeve tube 4*a* made of SUS 316 stainless steel to the welded sleeve tube 10 made of SUS 316 stainless steel, the silver solder joint 4*c* can be accessed from the outside after performing silver soldering, and therefore the flux residue can be removed.

Furthermore, silver soldering between the inner face of each of the terminal tubes 6 and the outer face of the corresponding conducting wire 7 can only be performed at the end of the production process for structural reasons in the first and second embodiments. However, the flux residue remaining inside the sleeve tube 4 cannot be removed because the interior of the sleeve tube 4 has already been hermetically sealed, and this residue may enter the inorganic insulating material powder 9 contained inside the sleeve tube that has been filled in the space between the MI cable 1 and the ceramic terminal 5, thus causing a reduction in insulation.

In the first and second embodiments, it is difficult to weld the terminal tubes 6 made of titanium to the respective corresponding conducting wires 7 made of copper because the welding would be performed between dissimilar metals. However, as in the present embodiment, adding the cap tubes 12 made of the same material as the conducting wires 7 makes it possible to weld the conducting wires 7 to the cap tubes 12, eliminating the possibility of a reduction in insulation caused by any flux residue.

It is structurally possible to perform silver soldering between each of the cap tubes 12 and the corresponding terminal tube 6 at the early stage of the production and the silver soldering portion can be accessed from the outside even after performing the silver soldering, so that the flux residue can be removed. Even if it is impossible to remove the flux residue because silver soldering is performed in the latter part of the production process and the sleeve tube is hermetically sealed, it is highly unlikely that the flux residue moves to the interior of the sleeve tube and causes a reduction in insulation since each of the cap tubes 12 is silver soldered to a portion of the corresponding terminal tube 6 that extrudes to the outside.

SUS 316 stainless steel, titanium, copper, silver solder, nickel-phosphorus, ceramic, and the inorganic insulating material, which are the materials used in the present embodiment, are all non-magnetic substances, and the conducting wires 7 are formed in a double helix configuration. Accordingly, the present embodiment is the same as the first and second embodiments in that, even if the MI cable is installed in a strong magnetic field, it is possible to minimize the influence of an external magnetic field on a signal or electric power to be transmitted and also minimize a disturbance of an external magnetic field. Also, the present embodiment is the same as the first and second embodiments in that there will be no reduction in insulation resistance resulting from the entry of moisture from the outside air since the interior of the MI cable 1 is isolated from the outside air, and that the adhesion between the ceramic terminal 5 and metal is firm and this adhesion can be maintained even at a high temperature.

Note that, in the above-described embodiments, in silver soldering between metal and ceramic, the silver soldering is performed after the surface of the silver soldering portion of ceramic is metalized with titanium and then nickel-phosphorus (Ni—P) plating is provided thereon in order to make the adhesion firm. The embodiments are characterized by the fact that silver solder, the metallizing material, and the plating material are all non-magnetic substances. However, the present invention is not limited thereto, and it is possible to use any metallizing and plating materials that are other non-magnetic substances that can replace titanium serving as the metallizing material and nickel-phosphorus serving as the plating material.

(Laying Configuration)

Next, a description will be given of a laying configuration of the termination sleeve-equipped MI cables according to the above-described first to third embodiments that do not disturb and are not affected by a magnetic field. Here, the MI cable 1 is characterized by the fact that the sheath 3 and the conducting wires 7 are insulated by the inorganic insulating material powder 8 contained inside the MI cable, and therefore the contact with an external conductive material during the laying does not affect a signal or electric power to be transmitted, and that the MI cable 1 has flexibility and thus can be easily laid with a high degree of freedom.

Figure 8:
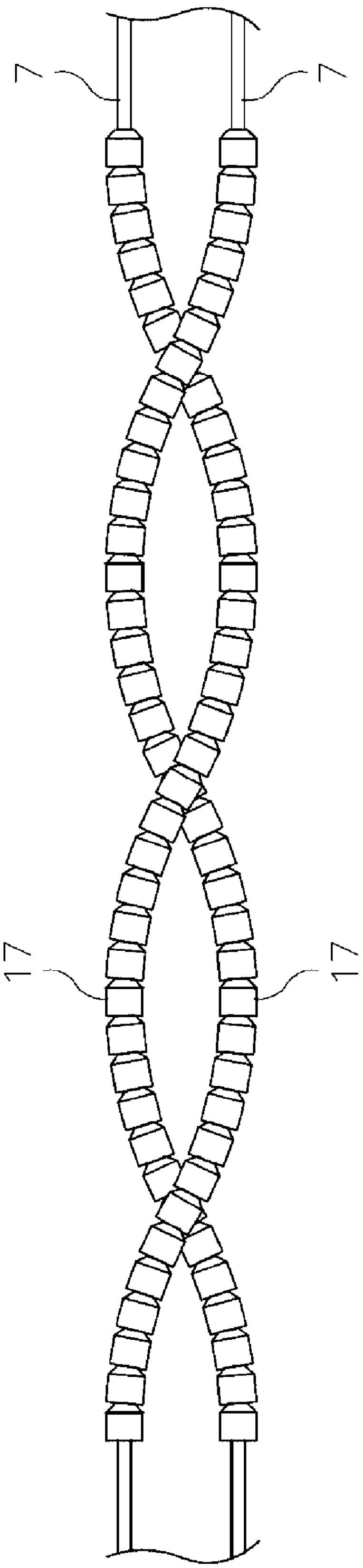
FIG. 8 shows wiring used for connecting the termination sleeve 2 to a vessel and an external facility.
Figure 9:
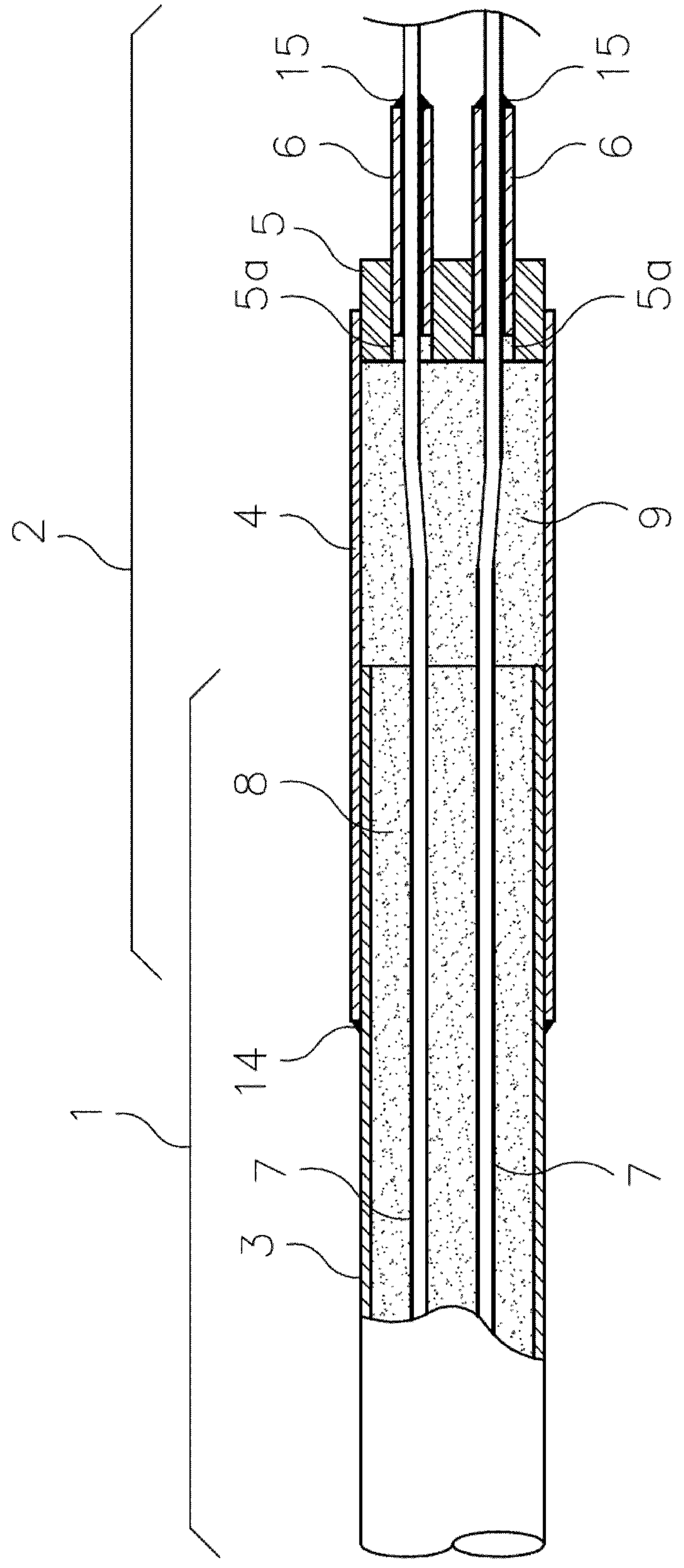
FIG. 9 is a cross-sectional view of an MI cable and a termination sleeve according to the conventional art.

One conceivable means for providing wiring with attention given not to disturb a magnetic field or not to be affected by a magnetic field, without using the termination sleeve-equipped MI cable of the present invention that does not disturb and is not affected by a magnetic field, is wiring in which the conducting wires 7 are inserted into short insulators 17 to form a beaded configuration, which is then twisted into a double helix configuration as shown in FIG. 8. However, in general, the conducting wires 7 do not have enough rigidity to maintain their shape, and therefore long wiring has low feasibility because of a significant increase in the number of supporting materials, although a short section of wiring can be achieved.

When a termination sleeve-equipped MI cable according to the present invention that does not disturb and is not affected by a magnetic field is laid in the interior of a vessel with a strong magnetic field and a high temperature in a fusion reactor, an accelerator or the like, the conducting wires 7 that are drawn out from the termination sleeve 2 located at one end portion of the MI cable 1 are usually connected to a feedthrough terminal of the vessel, and extend to the outside of the vessel through the feedthrough terminal. The conducting wires 7 that are drawn out from the termination sleeve 2 located at the other end portion are connected to an instrument or a facility to which electricity is supplied.

By installing the termination sleeve 2 near the feedthrough terminal of the vessel and near a conducting wire connecting portion of an instrument or a facility to which electricity is supplied, and providing short wiring between the termination sleeve 2 and the feedthrough terminal of the vessel and short wiring between the termination sleeve 2 and an instrument or a facility to which electricity is supplied as shown in FIG. 8, it is possible to achieve wiring with attention given not to disturb a magnetic field and not to be affected by a magnetic field over the entire wiring path.

The embodiments disclosed herein are to be construed in all respects as illustrative and not limiting. The scope of the present invention is expressed by not the above description, but claims of the invention. It is intended that the invention includes the meaning equivalent to claims of the invention and all changes within the scope of the invention.

INDUSTRIAL APPLICABILITY

In addition to being able to be used as a signal cable or a power cable that does not disturb and is not affected by a magnetic field in the interior of a vessel with a strong magnetic field and a high temperature in a fusion reactor, an accelerator, or the like, the present invention can also be used as a signal cable or a power cable that also serves as a feedthrough terminal that does not disturb and is not affected by a magnetic field by providing the sleeve tube or the welded sleeve tube of the present invention with plate-shaped projections and hermetically joining the projections, for example, by welding to a vessel of a fusion reactor, an accelerator, or the like, the interior of which has a strong magnetic field and a high temperature. Although, in general, the interior of a vessel of a fusion reactor or an accelerator is vacuum, the interior of the termination sleeve-equipped MI cable of the present invention that does not disturb and is not affected by a magnetic field is hermetically sealed and thus isolated from the outside, and therefore there is no problem in its use in vacuum.

In the interior of a fusion reactor or the like with a strong magnetic field and a high temperature, a high-frequency band MI cable for transmitting, for example, a signal for a plasma current measurement using a neutron detector or a Rogowskii coil may be required in some cases. In such cases, it is also possible to provide the MI cable with a high-frequency band by forming the MI cable as a coaxial MI cable including a single conducting wire or a double-shielded, double coaxial MI cable, and form these MI cables and the termination sleeve with non-magnetic materials based on the present invention. Such MI cables are often usable in practice and can often provide a signal cable having a high-frequency band required for the above-described measurement, although the degree of disturbance of an external magnetic field and the degree of influence from an external magnetic field may be higher than those when the conducting wires are formed in a double helix configuration.

DESCRIPTION OF REFERENCE NUMERALS

1 MI cable
2 Termination sleeve
3 Sheath
4 Sleeve tube
**4*a*** SUS 316 stainless steel portion of sleeve tube
**4*b*** Titanium portion of sleeve tube
**4*c*** Silver solder joint between SUS 316 stainless steel portion and titanium portion of sleeve tube
5 Ceramic terminal
**5*a*** Ceramic terminal through-hole
6 Terminal tube
7 Conducting wire
8 Inorganic insulating material powder contained in MI cable
9 Inorganic insulating material powder contained in sleeve tube
10 Welded sleeve tube
11 Weld between sheath and welded sleeve tube
12 Cap tube
13 Weld between cap tube and conducting wire

14 Weld between sheath and sleeve tube
15 Weld between terminal tube and conducting wire
16 Weld between SUS 316 stainless steel portion of sleeve tube and welded sleeve tube
17 Insulator

The invention claimed is:

1. A termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein:

the MI cable uses non-magnetic stainless steel as a material of the sheath, and the conducting wires accommodated therein are a pair or a plurality of pairs of conducting wires that are each formed in a double helix configuration, and each pair of the conducting wires is a single round-trip signal line or a single round-trip electric power line;

the termination sleeve comprises a titanium sleeve tube, a ceramic terminal, and titanium terminal tubes;

a termination portion of the MI cable is inserted up to an intermediate portion of the sleeve tube;

an opening of the sleeve tube located on a side opposite to the side on which the MI cable is inserted is closed by the ceramic terminal;

the ceramic terminal is provided with the same number of through-holes as the number of the conducting wires of the MI cable, and the terminal tubes are inserted into the respective corresponding through-holes;

a trailing edge of each of the conducting wires extends to the outside of the termination sleeve through the corresponding terminal tube;

an inner face of the sleeve tube and an outer face of the sheath of the MI cable, an outer face of the ceramic terminal and an inner face of the sleeve tube, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof; and the silver soldering between the ceramic terminal and the sleeve tube, and between the ceramic terminal and each of the terminal tubes is performed after a surface of the ceramic terminal is metallized with titanium and plated with nickel-phosphorus.

2. A termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein:

the MI cable uses non-magnetic stainless steel as a material of the sheath, the conducting wires accommodated therein are a pair or a plurality of pairs of conducting wires that are each formed in a double helix configuration, and each pair of the conducting wires is a single round-trip signal line or a single round-trip electric power line, and a termination portion of the MI cable is inserted into a welded sleeve tube made of non-magnetic stainless steel, which is the same as the material of the sheath, such that an end edge of the MI cable and an end edge of the welded sleeve tube are located at the same position;

the termination sleeve comprises a titanium sleeve tube, a ceramic terminal, and titanium terminal tubes;

a termination portion of the welded sleeve tube into which the MI cable is inserted is inserted up to an intermediate portion of the sleeve tube, and the welded sleeve tube has a length such that a leading edge of the sleeve tube is located on the welded sleeve tube in a state in which the welded sleeve tube is inserted into the sleeve tube;

an opening of the sleeve tube located on a side opposite to the side on which the sheath is inserted is closed by the ceramic terminal;

the ceramic terminal is provided with the same number of through-holes as the number of the conducting wires of the MI cable, and the terminal tubes are inserted into the respective corresponding through-holes;

a trailing edge of each of the conducting wires extends to the outside of the termination sleeve through the corresponding terminal tube;

an inner face of the sleeve tube and an outer face of the welded sleeve tube, an outer face of the ceramic terminal and an inner face of the sleeve tube, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof, and a cross section of an end edge portion of the sheath of the MI cable and a cross section of an end edge portion of the welded sleeve tube are welded around the entire circumference thereof; and the silver soldering between the ceramic terminal and the sleeve tube, and between the ceramic terminal and each of the terminal tubes is performed after a surface of the ceramic terminal is metallized with titanium and plated with nickel-phosphorus.

3. A termination sleeve-equipped MI cable including an MI cable that accommodates conducting wires in a metal sheath with an inorganic insulating material powder disposed between the conducting wires and the metal sheath, and a termination sleeve provided at a termination of the MI cable, wherein:

the MI cable uses non-magnetic stainless steel as a material of the sheath, the conducting wires accommodated therein are a pair or a plurality of pairs of conducting wires that are each formed in a double helix configuration, and each pair of the conducting wires is a single round-trip signal line or a single round-trip electric power line, and a termination portion of the MI cable is inserted into a welded sleeve tube made of non-magnetic stainless steel, which is the same as the material of the sheath, such that an end edge of the MI cable and an end edge of the welded sleeve tube are located at the same position;

the termination sleeve comprises a sleeve tube, a ceramic terminal, and titanium terminal tubes, one side of the sleeve tube being made of non-magnetic stainless steel, which is the same as the material of the sheath and the welded sleeve tube, and another side thereof being made of titanium, the border between the non-magnetic stainless steel and the titanium being arranged at an intermediate portion of the sleeve tube;

a termination portion of the welded sleeve tube into which the MI cable is inserted is inserted up to the intermediate portion of the sleeve tube from the side of the sleeve tube that is made of non-magnetic stainless steel, and the welded sleeve tube has a length such that a leading edge of the sleeve tube is located on the welded sleeve tube in a state in which the welded sleeve tube is inserted into the sleeve tube;

an opening of the sleeve tube located on a side opposite to the side on which the sheath is inserted is closed by the ceramic terminal;

the ceramic terminal is provided with the same number of through-holes as the number of the conducting wires of the MI cable, and the terminal tubes are inserted into the respective corresponding through-holes;

a trailing edge of each of the conducting wires extends to the outside of the termination sleeve through the corresponding terminal tube;

a portion of the sleeve tube that is made of non-magnetic stainless steel and a portion thereof that is made of titanium, an outer face of the ceramic terminal and an inner face of the sleeve tube, each of the through-holes of the ceramic terminal and an outer face of the corresponding terminal tube, and an inner face of each of the terminal tubes and an outer face of the corresponding conducting wire are, in each respective pair, bonded by silver soldering around the entire circumference thereof, and a cross section of an end edge portion of the sheath of the MI cable and a cross section of an end edge portion of the welded sleeve tube, and a leading edge of the portion of the sleeve tube that is made of non-magnetic stainless steel and the welded sleeve tube are welded around the entire circumference thereof; and the silver soldering between the ceramic terminal and the sleeve tube, and between the ceramic terminal and each of the terminal tubes is performed after a surface of the ceramic terminal is metallized with titanium and plated with nickel-phosphorus.

4. The termination sleeve-equipped MI cable that does not disturb and is not affected by a magnetic field, according to any one of claims 1 to 3, further comprising:

a cap tube into which is inserted an externally exposed end portion of each of the terminal tubes inserted into the respective corresponding through-holes of the ceramic terminal, the cap tube being made of a non-magnetic substance, which is the same as the material of the conducting wires, wherein:

the conducting wires extend to the outside of the termination sleeve through the respective corresponding terminal tubes and the respective corresponding cap tubes; and an outer face of each of the terminal tubes and an inner face of the corresponding cap tube are bonded by silver soldering around the entire circumference thereof, and each of the conducting wires and the corresponding cap tube are welded around the entire circumference thereof at an end portion of the cap tube located on a side opposite to the side on which the corresponding terminal tube is inserted.

* * * * *